United States Patent
Maeda

(10) Patent No.: US 11,807,043 B2
(45) Date of Patent: Nov. 7, 2023

(54) PNEUMATIC TIRE

(71) Applicant: Sumitomo Rubber Industries, Ltd., Kobe (JP)

(72) Inventor: Yohei Maeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 131 days.

(21) Appl. No.: 17/111,951

(22) Filed: Dec. 4, 2020

(65) Prior Publication Data

US 2021/0197620 A1 Jul. 1, 2021

(30) Foreign Application Priority Data

Dec. 25, 2019 (JP) ................................. 2019-234860

(51) Int. Cl.
*B60C 11/01* (2006.01)
*B60C 11/12* (2006.01)
*B60C 11/03* (2006.01)

(52) U.S. Cl.
CPC .......... *B60C 11/01* (2013.01); *B60C 11/1204* (2013.01); *B60C 11/1236* (2013.01);
(Continued)

(58) Field of Classification Search
CPC .... B60C 11/01; B60C 2011/013; B60C 13/00
See application file for complete search history.

(56) References Cited

U.S. PATENT DOCUMENTS

| | | | |
|---|---|---|---|
| 10,358,002 B2 | 7/2019 | Ishigaki | |
| 2007/0012389 A1* | 1/2007 | Ito | B60C 11/047 |
| | | | 152/209.22 |

(Continued)

FOREIGN PATENT DOCUMENTS

| | | |
|---|---|---|
| EP | 2835274 A1 | 2/2015 |
| EP | 2937230 A1 | 10/2015 |

(Continued)

OTHER PUBLICATIONS

Extended European Search Report, dated Apr. 9, 2021, for European Application No. 20216840.7.

*Primary Examiner* — Cedrick S Williams
(74) *Attorney, Agent, or Firm* — Birch, Stewart, Kolasch & Birch, LLP

(57) ABSTRACT

A pneumatic tire has a tread portion provided with shoulder blocks arranged along the tread edges and each having a side surface extending radially inwardly from the tread edge. The side surface includes a first surface section and a second surface section arranged in the tire circumferential direction and protruding outward of the tire than the groove bottom surfaces of the shoulder lateral grooves. In a tire meridian section including the first surface section, the profile line of the first surface section extends from the tread edge to a position corresponding to a position of the radial inner ends of the shoulder lateral grooves. In a tire meridian section including the second surface section, the profile line of the second surface section extends from the tread edge to a position corresponding to the above-said position of the radial inner ends through a path inward of the tire than that of the profile line of the first surface section.

20 Claims, 4 Drawing Sheets

(52) U.S. Cl.
CPC . *B60C 2011/013* (2013.01); *B60C 2011/0346* (2013.01); *B60C 2011/1254* (2013.01)

(56) References Cited

U.S. PATENT DOCUMENTS

2010/0147426 A1* 6/2010 Janesh .................... B60C 11/11
  152/209.24
2013/0312889 A1* 11/2013 Hanami .................. B60C 11/11
  152/209.18

FOREIGN PATENT DOCUMENTS

| EP | 3275698 A1 | 1/2018 |
| JP | 2000-280711 A | 10/2000 |
| JP | 2017-121876 A | 7/2017 |

* cited by examiner

PNEUMATIC TIRE

TECHNICAL FIELD

The present invention relates to a pneumatic tire which is improved in the mud performance and fuel efficiency while securing cut resistance.

BACKGROUND ART

In the pneumatic tires designed for vehicles such as four-wheel drive vehicles and sport-utility vehicles, buttress portions, or radially outer portions of tire sidewalls near the tread edges are usually provided with protrusions which are arranged in the tire circumferential direction at intervals in order to improve mud performance, namely, traction performance when running on muddy terrains. (see, Patent document 1)

Patent Document 1: Japanese Patent Application Publication No. 2017-121876

SUMMARY OF THE INVENTION

Problems to be Solved by the Invention

The above-mentioned protrusions may also increase the cut resistance of the buttress portions to prevent the buttress portions from being damaged by cuts caused by edged objects such as stones and rocks.

The above-mentioned protrusions, however, cause an increase in the tire weight, which may deteriorate the fuel efficiency of the vehicle.

On the other hand, it may be conceivable to provide recesses instead of the protrusions in the buttress portions. The recesses will improve the mud performance and the fuel efficiency, but the thickness of the sidewall rubber at the recesses will become insufficient. Therefore, a significant decrease in the cut resistance is inevitable.

Thus, simply providing the protrusions or recesses in the buttress portions is not enough for achieving the cut resistance, mud performance and fuel efficiency at the same time.

The present invention was made in view of the above by focusing on the side surfaces of the axially outermost shoulder blocks which have a large effect on the mud performance and a very small effect on the cut resistance, and a primary objective of the present invention is to provide a pneumatic tire in which the mud performance and fuel efficiency is improved without sacrificing the cut resistance.

According to the present invention, a pneumatic tire comprises:

a tread portion provided with a plurality of shoulder lateral grooves extending axially outwardly to the tread edge and then radially inwardly from the tread edge, and a plurality of shoulder blocks divided by the shoulder lateral grooves, wherein each of the shoulder blocks has a side surface extending radially inwardly from the tread edge, the side surface includes a first surface section and a second surface section which are arranged in the circumferential direction of the tire, and protrude outward of the tire than the groove bottom surfaces of the shoulder lateral grooves, in a tire meridian section including the first surface section, the profile line of the first surface section extends from the tread edge to a position corresponding to a position of the radial inner ends of the shoulder lateral grooves, and in a tire meridian section including the second surface section, the profile line of the second surface section extends from the tread edge to a position corresponding to the above-said position of the radial inner ends of the shoulder lateral grooves through a path inward of the tire than that of the profile line of the first surface section.

It is preferable that each of the shoulder lateral grooves comprises a main portion extending axially outwardly at least to a position corresponding to the tread edge, and a secondary portion extending radially inwardly from the main portion, and inclined toward one side in the tire circumferential direction at an angle θ with respect to the main portion.

It is preferable that the angle θ is in a range from 20 to 45 degrees.

It is preferable that the profile line of the first surface section is a straight line or alternatively an arc extending through a path inward of the tire than the straight line.

It is preferable that the profile line of the second surface section has the most distant position from the profile line of the first surface section when these profile lines are superimposed, and the radial dimension H2 from the tread edge to the most distant position is not more than 0.5 times the radial dimension H1 from the tread edge to the above-said position of the radial inner ends of the shoulder lateral grooves, namely, the condition (H2/H1<=0.5) is satisfied.

It is preferable that in each of the shoulder blocks, the total length ΣL2 in the tire circumferential direction of the second surface section or sections measured at the tread edge is not less than 0.3 times and not more than 0.7 times the length L0 in the tire circumferential direction of the shoulder block measured at the tread edge, namely, the condition (0.3<=ΣL2/L0<=0.7) is satisfied.

It is preferable that each of the shoulder blocks satisfy the following condition (3):

$$0.2 <= (V0-V1)/V0 <= 0.6 \qquad (3)$$

wherein

V0 is a volume enclosed by a virtual side surface which is the above-said side surface of which entirety is assumed as being formed by the first surface section to have the profile line of the first surface section, a radial surface defined as extending radially inwardly from the tread edge in parallel to the tire radial direction, and a groove bottom extension surface which is a surface extended from the groove bottom in the tire circumferential direction, and V1 is a volume of a portion enclosed by the actual side surface, the above-said radial surface, and the above-said groove bottom extension surface.

The tread edges Te are the axial outermost edges of the ground contacting patch of the tire which occurs under a normally inflated loaded condition when the camber angle of the tire is zero.

The normally inflated loaded condition is such that the tire is mounted on a standard wheel rim and inflated to a standard pressure and loaded with a standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under a normally inflated unloaded condition of the tire unless otherwise noted. The normally inflated unloaded condition is such that the tire is mounted on the standard wheel rim and inflate to the standard pressure but loaded with no tire load.

In the present invention, as described above, the side surface of the shoulder block comprises the first surface section and the second surface section which are arranged in the tire circumferential direction.

The first surface section and the second surface section protrude outward of the tire than the groove bottom surfaces of the shoulder lateral grooves. Thus, the cut resistance can be maintained as a result of that the first and second surface sections are located on the side of the shoulder blocks which have little effect on the cut resistance, and that a larger rubber thickness is secured under the first and second surface sections than under the groove bottom surfaces of the shoulder lateral grooves.

Further, the profile line of the second surface section extends through the path inward of the tire than the profile line of the first surface section. That is, the second surface section is concave with respect to the first surface section. Thereby, the mud performance can be improved in combination with the fact that the first and second surface sections are located on the side of the shoulder blocks which have a significant impact on the mud performance.

DESCRIPTION OF THE PREFERRED EMBODIMENTS

Embodiments of present invention will now be described in detail in conjunction with accompanying drawings.

Figure 1:
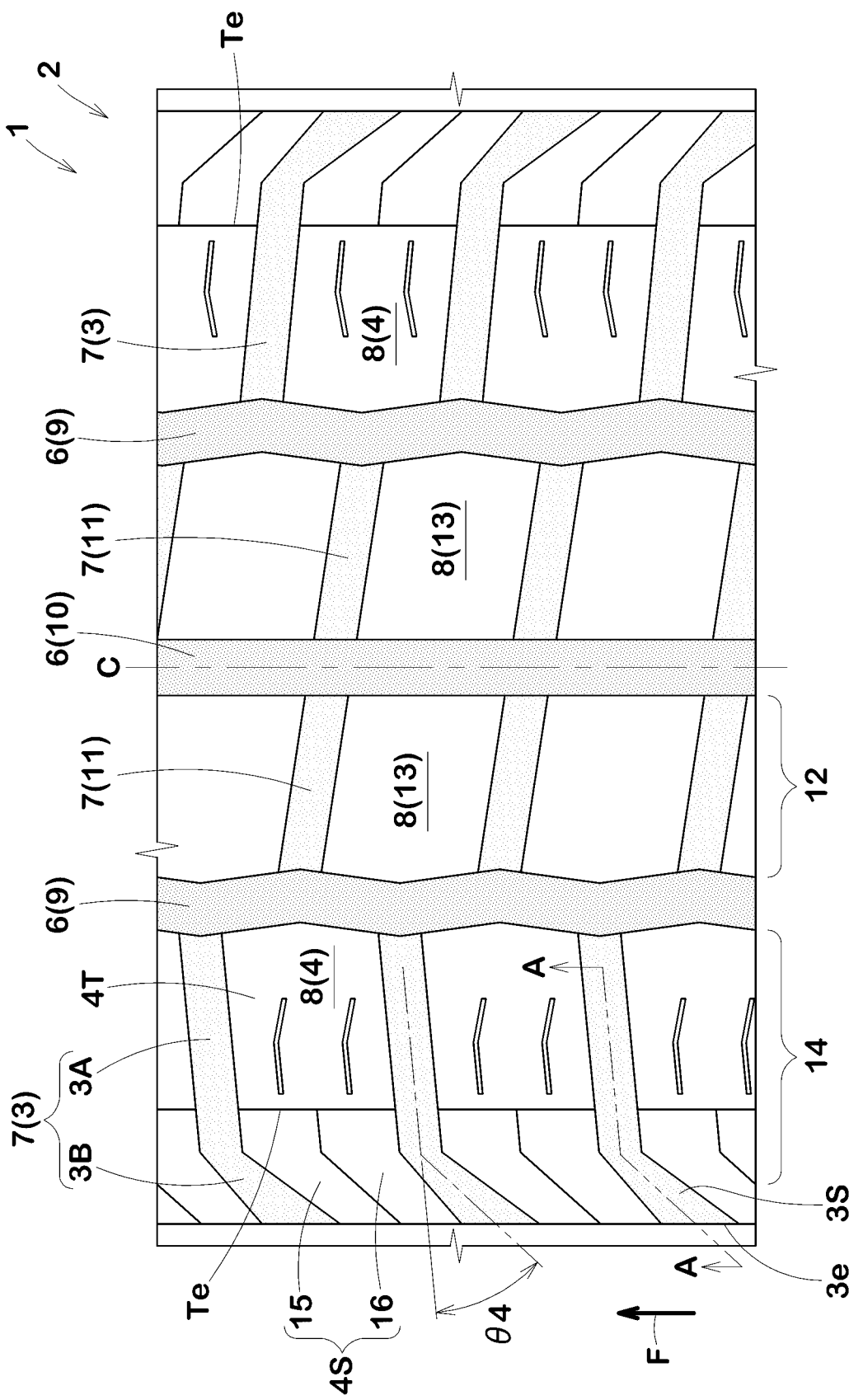
FIG. 1 is a developed partial view of the tread portion of a pneumatic tire as an embodiment of the present invention.

As shown in FIG. 1, a pneumatic tire 1 as an embodiment of the present invention comprises a tread portion 2 having a tread surface contacting with the ground and provided with a plurality of shoulder lateral grooves 3 and a plurality of shoulder blocks 4 circumferentially divided by the shoulder lateral grooves 3.

The tread portion 2 in this example is provided with a plurality of circumferential grooves 6 extending in the tire circumferential direction, and a plurality of lateral grooves 7 including the above-said shoulder lateral grooves 3, whereby the tread portion 2 is divided into a plurality of blocks 8, including the shoulder blocks 4.

The circumferential grooves 6 in this example are two axially outermost shoulder circumferential grooves 9, and one crown circumferential groove 10 disposed therebetween.

In this embodiment, the shoulder circumferential grooves 9 are zigzag grooves, and the crown circumferential groove 10 is a straight groove.

The lateral grooves 7 in this example are crown lateral grooves 11 and shoulder lateral grooves 3.

The crown lateral grooves 11 are disposed in two land portions 12 defined between the respective shoulder circumferential grooves 9 and the crown circumferential groove 10 so as to circumferentially divide each land portion 12 into crown blocks 13.

In this embodiment, the crown lateral grooves 11 are straight grooves.

In this embodiment, the crown lateral grooves 11 are inclined in one direction with respect to the tire axial direction.

The shoulder lateral grooves 3 are disposed in two shoulder land portions 14 defined as extending axially outwardly from the respective shoulder circumferential grooves 9 so as to circumferentially divide each shoulder land portion 14 into shoulder blocks 4.

Figure 3:
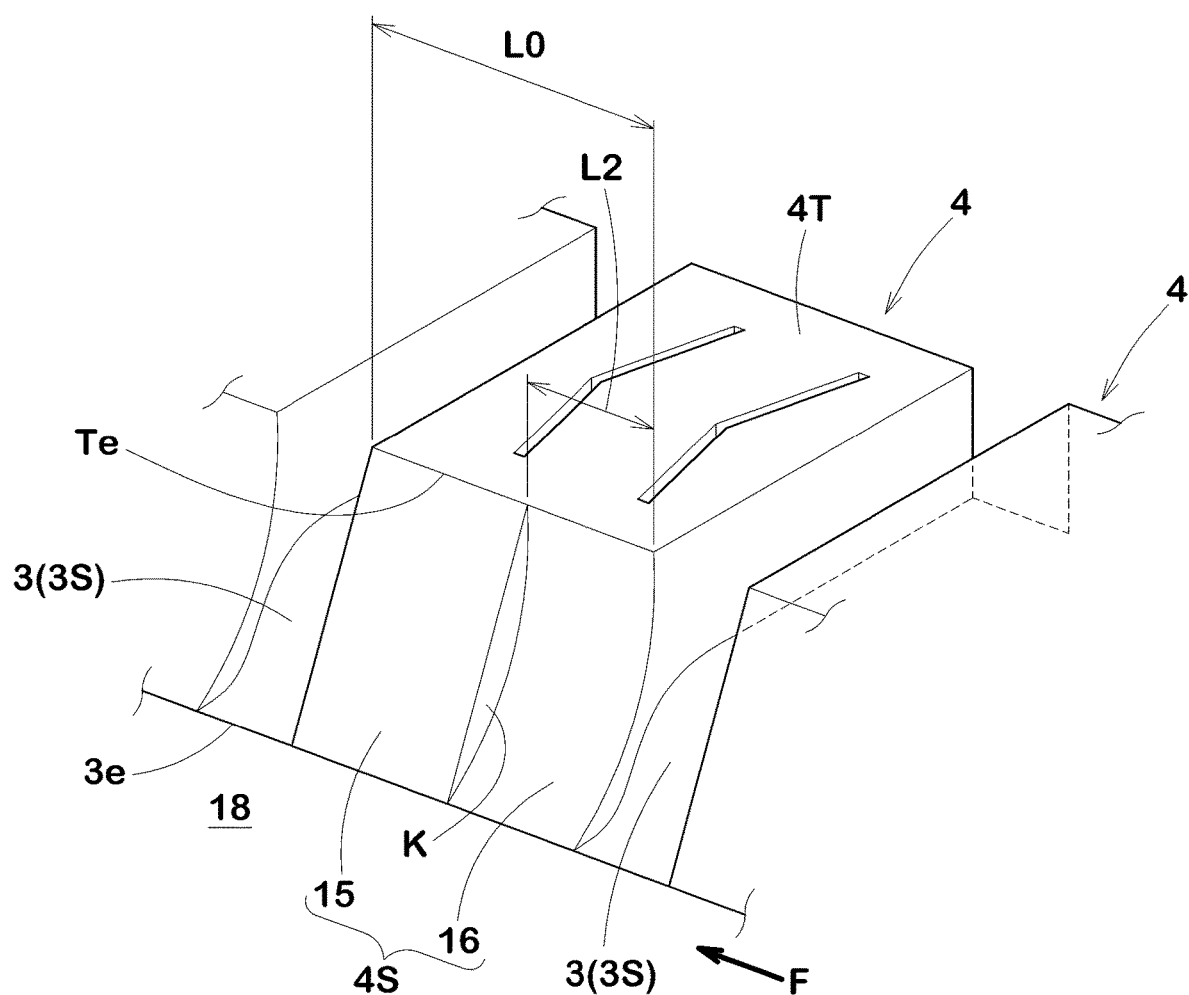
FIG. 3 is a perspective view of the shoulder block.

As shown in FIGS. 1 and 3, each of the shoulder lateral grooves 3 extends axial outwardly beyond the tread edge Te and then extend radially inwardly from the tread edge Te. Each of the shoulder blocks 4 has a ground contacting top surface having the axially outermost edge forming a part of the tread edge Te, and a side surface 4S extending radially inwardly from the axially outermost edge.

FIG. 3 is a diagram conceptually illustrating the shoulder groove 3 and the shoulder block 4 in which, for convenience, the shoulder grooves 3 is depicted as a straight groove extending in the axial direction of the tire. In this embodiment, the blocks 8 including the shoulder blocks 4 each have a pentagonal top surface having two parallel straight circumferential edges, a straight axial edge, and an zigzag axial edge as shown in FIG. 1.

As shown in FIG. 3, in this example, the tire a has a squared shoulder. That is, the ground contacting top surface 4T and the above-said side surface 4S of the shoulder block 4 intersect with each other so as to form an angled corner, and the line of the intersection constitutes the above-said part of the tread edge Te.

The side surface 4S comprises a first surface section 15 and a second surface section 16, which are arranged in the tire circumferential direction, and protrude outward of the tire from the groove bottoms 3S of the shoulder lateral grooves 3.

In the shoulder blocks 4 disposed along each of the tread edges Te, the first surface sections 15 and the second surface sections 16 are arranged alternately in the tire circumferential direction.

Preferably, the side surface 4S consists of one first surface section 15 and one second surface section 16. However, it may b possible that the side surface 4S comprises a plurality of the first surface section portions 15, and/or a plurality of the second surface sections 16.

In this case, it is preferable that the number N15 of the first surface section(s) 15 is less than or equal to the number N16 of the second surface section(s) 16.

In particular, it is preferable that the number N15 is 1, and the number N16 is 1 or 2.

Figure 2:
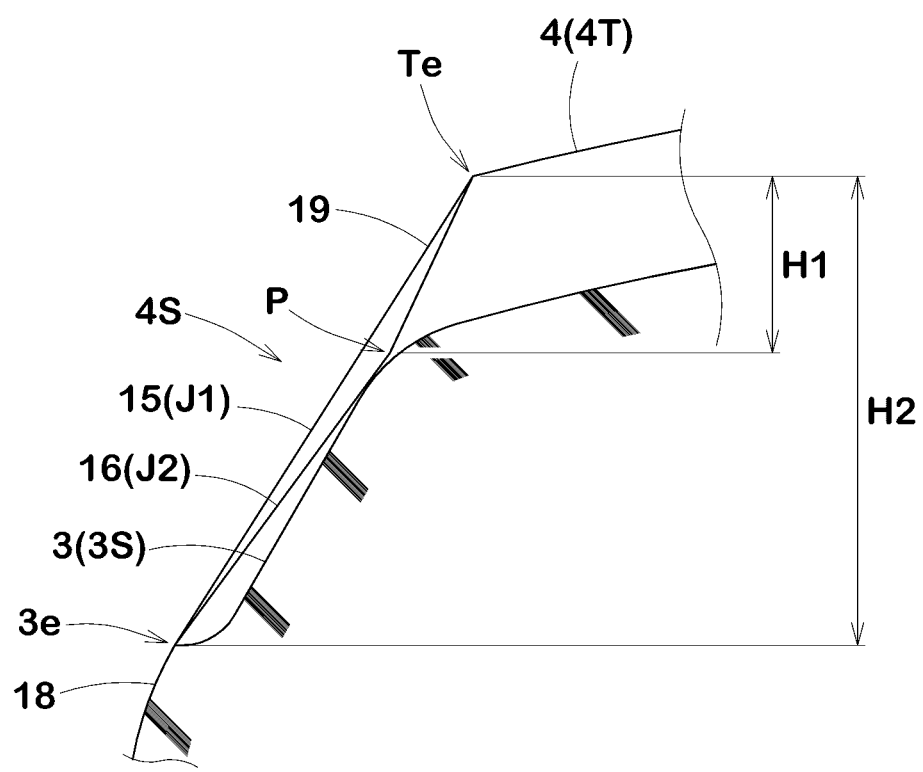
FIG. 2 is a cross sectional view of the shoulder lateral groove taken along line A-A of FIG. 1, showing the profile line of the groove bottom together with the profile lines of the first and second surface sections.

In a tire meridian section including the first surface section 15, the profile line J1 of the first surface section 15 extends from the tread edge Te to a position corresponding to that of the radially inner end 3e of the shoulder lateral groove 3 as shown in FIG. 2.

The radially inner end 3e corresponds to the intersection of the bottom surface 3s of the shoulder lateral groove 3 and the laterally-directed surface 18 of the tire.

In a tire meridian section including the second surface section 16, the profile line J2 of the second surface section 16 extends from the tread edge Te to a position corresponding to that of the radially inner end 3e of the shoulder lateral groove 3, wherein
the profile line J2 extends through a path inward of the tire than the profile line J1 when these profile lines J1 and J2 are superimposed as shown in FIG. 2.

Therefore, a stepped surface K (shown in FIG. 3) is formed between the second surface section 16 and the first surface section 15.

When running on muddy terrain, the side surfaces 4S of the shoulder blocks 4 have a greater opportunity to come in contact with the soil since they are adjacent to the tread edges Te, and have a significant impact on mud performance. Therefore, by providing the first surface section 15 and the second surface section 16 on the side surface 4S, the resultant stepped surface K is able to catch the soil, and effectively exert traction force when driving on muddy terrain. Thus, it is possible to achieve excellent mud performance.

Further, it is possible to maintain the cut resistance since the first surface sections 15 and the second surface sections 16 protrude outward of the tire from the groove bottom 3s of the shoulder lateral grooves 3, and the first surface sections 15 and the second surface sections 16 are located on the shoulder blocks' side surfaces 4S which have little effect on the cut resistance, and a larger rubber thickness can be secured under the first surface sections 15 and the second surface sections 16 than under the groove bottoms of the shoulder lateral grooves 3.

In addition, since the second surface section 16 is concave with respect to the first surface section 15, a weight reduction is possible as compared with the case where the entire side surface 4S is formed by the first surface section 15 alone. As a result, it may be possible to improve the fuel efficiency.

As the profile line J1 of the first surface section 15, profile lines for the side surfaces of conventional shoulder blocks can be adopted.

In order to effectively derive excellent mud performance, it is preferable that all of the stepped surfaces K of the shoulder blocks 4 face toward the opposite direction to the intended rotational direction F of the tire.

In this embodiment, all of the stepped surfaces K face toward the opposite direction to the intended rotational direction F. Thus, the tire 1 in this embodiment may be unidirectional, and the shoulder blocks 4 on one side of the tire equator are symmetrical about the tire equator with the shoulder blocks 4 on the other side of the tire equator It is however possible that the stepped surfaces K of the shoulder blocks 4 on one side of the tire equator face toward one of two opposite circumferential directions, and the stepped surfaces K of the shoulder blocks 4 on the other side of the tire equator face toward the other of the two opposite circumferential directions. Thus, the tire 1 may be bidirectional.

In this example, the profile line J1 of the first surface section 15 is a straight line 19 extending from the tread edge Te to the position corresponding to that of the radially inner ends 3e of the shoulder lateral grooves 3. However, in order to reduce the weight, the profile line J1 may be an arc extending through a path inward of the tire than the straight line 19.

In this case, it is preferable that the arc has a single radius of curvature in order to uniformize the deflection.

In the present embodiment, it is preferable that the distance between the profile line J1 of the first surface section 15 and the profile line J2 of the second surface section 16 when these profile lines are superimposed, becomes a maximum at a position P on the profile line J2 (hereinafter the most distant position P).

And it is preferable that the most distant position P satisfies the following condition (1):

$$H2/H1<=0.5 \tag{1}$$

wherein
H2 is a radial dimension from the tread edge Te to the most distant position P, and
H1 is a radial dimension from the tread edge Te to the above-said position corresponding to the radially inner ends 3e.

The most distant position P is such a position that the catching of the soil, namely, traction force is the largest because the step difference between the first surface section 15 and the second surface section 16 is the largest.

When driving on muddy terrain, if the tire does not sink to the most distant position P, then the stepped surface K will not be able to exert sufficient traction force.

Therefore, by configuring the stepped surface K to satisfy the condition (1), traction force can be sufficiently exerted to improve mud performance even if the sinking of the tire into the ground is shallow.

In the present invention, it is preferable that, in each of the shoulder blocks 4,
a length L0 in the tire circumferential direction of the shoulder block 4 measured at the tread edge Te, and
a total length $\Sigma L2$ in the tire circumferential direction of the second surface section 16 or second surface sections 16 measured at the tread edge Te satisfy the following condition (2):

$$0.3<=\Sigma L2/L0<=0.7 \tag{2}$$

In the present embodiment, as shown in FIG. 3, the single second surface section 16 is provided, therefore, the total length $\Sigma L2$ is equal to the length L2 in the tire circumferential direction of the single second surface section 16.

If the ratio $\Sigma L2/L0$ is less than 0.3, the occupation of the second surface section(s) 16 in the side surface 4S becomes insufficient to improve the mud performance and fuel efficiency. If the ratio $\Sigma L2/L0$ is more than 0.7, the occupation of the second surface section(e) 16 becomes excessive, therefore, the cut resistance tends to decrease although the mud performance and fuel efficiency may be improved. Further, the rigidity of the shoulder block 4 is reduced, and the steering stability on paved roads may be reduced.

Thus, the ratio $\Sigma L2/L0$ is more preferably set to be not less than 0.4, and more preferably set to be not more than 0.6.

Figure 4A:
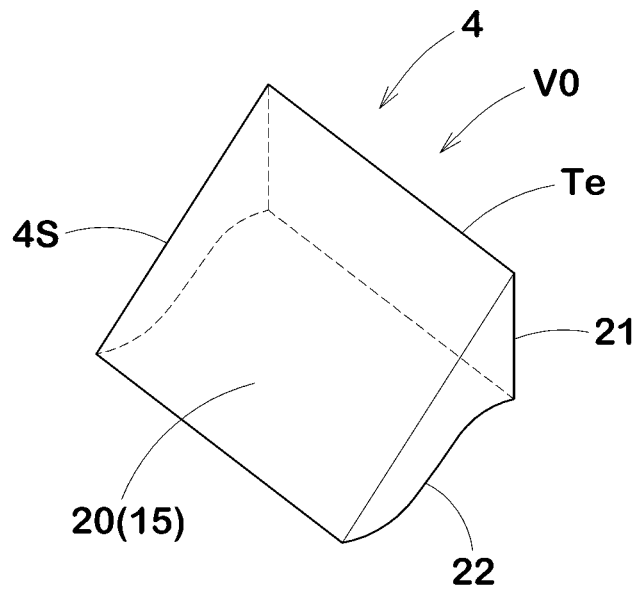
FIGS. 4A and 4B are diagrams for explaining the volumes V0 and V1.
Figure 4B:
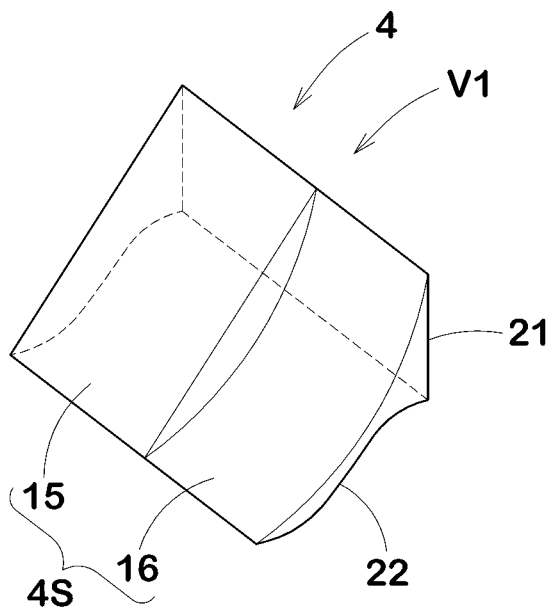

In the present embodiment, it is preferable that each of the shoulder blocks 4 satisfy the following condition (3):

$$0.2<=(V0-V1)/V0<=0.6 \tag{3}$$

wherein, as shown in FIGS. 4A and 4B,

V0 is a volume enclosed by
a virtual side surface 20 which is the above-said side surface 4S of which entirety is assumed as being formed by the first surface section 15 to have the profile line J1 of the first surface section 15,
a radial surface 21 defined as extending radially inwardly from the tread edge Te in parallel to the tire radial direction, and a groove bottom extension surface 22 which is a surface extended from the groove bottom in the tire circumferential direction, and V1 is a volume of a portion enclosed by
the actual side surface 4S,
the above-said radial surface 21, and
the above-said groove bottom extension surface 22.

The difference (V0−V1) between the volume (V0) and the volume (V1) corresponds to the recessed volume depressed from the first surface section 15 by the second surface section(s) 16.

If (V0−V1)/V0 is less than 0.2, as the recessed volume is too small, the improvement in the mud performance and the fuel efficiency will be insufficient.

If (V0−V1)/V0 is more than 0.6, as the recessed volume is excessive, the cut resistance tends to decrease although the mud performance and the fuel efficiency may be improved. Further, the rigidity of the shoulder block 4 is reduced, and the steering stability on paved roads may be reduced.

Thus, the value of (V0−V1)/V0 is preferably set to be not less than 0.25, and preferably set to be not more than 0.5.

In the present embodiment, each of the shoulder lateral grooves 3 is a bent groove as shown in FIG. 1, which comprises a main portion 3A extending over at least the entire width of the ground contacting top surface 4T of the shoulder block 4, and
a secondary portion 3B extending from the main portion 3A through between the adjacent side surfaces 4S while inclining to one side in the tire circumferential direction at an inclination angle θ with respect to the main portion 3A in a developed view in which the tread portion 2 between the tread edges Te and the side surfaces 4S are developed in a plane as shown in FIG. 1. In the developed view, the linearly extending main portion 3A of the shoulder lateral groove 3 in the present embodiment, extends beyond the tread edge Te, and then the groove 3 is bent in a position between the side surfaces 4S.

But, it is also possible that the groove 3 is bent at the tread edge Te, therefore, the main portion 3A extends to the tread edge Te and the secondary portion 3B from the tread edge Te.

Such shoulder lateral groove 3 can disperse and mitigate impact shock in the tire radial direction on the shoulder block by the bending deformation of the shoulder lateral groove 3.

That is, when the tire is deflected, the shoulder lateral groove 3 is deformed to bent, and distributes the impact shock from the rim without concentrating it in the tire radial direction, which can improve the cut resistance.

In this case, it is desirable that the inclination angle θ is set in a range from 20 and 45 degrees.

If the angle θ is less than 20 degrees, the improvement in the cut resistance becomes insufficient.

If the angle θ is more than 45 degrees, there is occurred a portion where deflection becomes increased locally in the cross-sectional direction of the tire, thereby the steering stability and ride comfort performance are liable to deteriorate.

It is preferable that, in order to improve the mud performance,
the secondary portion 3B is bent toward the direction opposite to the tire rotational direction F while extending radially inwardly.

As with the stepped surfaces K, when the tire is unidirectional for which the intended rotational direction F is specified, it is desirable that all of the secondary portions 3B of the shoulder lateral grooves 3 of the shoulder blocks on both sides of the tire equator, are bent toward the direction opposite to the tire rotation direction F.

While detailed description has been made of an especially preferable embodiment of the present invention, the present invention can be embodied in various forms without being limited to the illustrated embodiment.

Working Examples

Based on the structure shown in FIGS. 1-3, pneumatic tires of size 265/65R17 for sport-utility vehicles were experimentally manufactured as test tires Ref. 1 and Ex. 1-Ex. 18 and tested for the cut resistance, mud performance and fuel efficiency as follows. The test tires had the same specifications except for those shown in Table 1.

(1) Cut Resistance Test
The test tires mounted on wheel rims of size 17×87 and inflated to 220 kPa were installed on all wheels of a test vehicle (3500 cc four-wheel drive SUV). Then the test vehicle was run on an off-road test course including a muddy area. After running for 20 km, the incidence of cuts in the buttress portions was obtained.
The results are indicated in Tables 1 and 2 by an index based on comparative example Ref. 1 being 100, wherein the larger the value, the better the cut resistance.

(2) Mad Performance Test
when the test vehicle was running on the above-mentioned off-road test course, the test driver evaluated the mud performance. The results are indicated in Tables 1 and 2 by an index based on comparative example Ref. 1 being 100, wherein the larger the value, the better the mad performance.

(3) Fuel Consumption Test
using a rolling resistance tester, each test tire was measured for the rolling resistance at a speed of 80 km/h under the tire load of 8.78 kN and the tire pressure of 210 kPa.
The results are indicated in Tables 1 and 2 by an index based on comparative example Ref. 1 being 100, wherein the larger the value, the better the rolling resistance or fuel efficiency.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| side surface | presence | presence | presence | presence | presence | presence | presence | presence | presence | presence |
| first surface section | straight | straight | straight | straight | straight | straight | straight | straight | straight | straight |
| profile line second surface section | absence | presence | presence | presence | presence | presence | presence | presence | presence | presence |

TABLE 1-continued

| Tire | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| shoulder lateral groove secondary portion | not bent absence | bent presence | bent presence | bent presence | bent presence | bent presence | bent presence | bent presence | bent presence | bent presence |
| angle θ (deg.) | 0 | 35 | 35 | 35 | 35 | 35 | 35 | 35 | 35 | 35 |
| (V0−V1)/V0 | 0 | 0.4 | 0.2 | 0.6 | 0.15 | 0.65 | 0.4 | 0.4 | 0.4 | 0.4 |
| H2/H1 | 0 | 0.3 | 0.3 | 0.3 | 0.3 | 0.3 | 0.5 | 0.6 | 0.3 | 0.3 |
| ΣL2/L0 | 0 | 0.5 | 0.5 | 0.5 | 0.5 | 0.5 | 0.5 | 0.5 | 0.3 | 0.7 |
| cut resistance | 100 | 120 | 120 | 110 | 120 | 105 | 120 | 120 | 120 | 110 |
| mad performance | 100 | 120 | 110 | 120 | 105 | 120 | 110 | 105 | 110 | 120 |
| fuel efficiency | 100 | 120 | 110 | 120 | 105 | 120 | 120 | 120 | 110 | 120 |

TABLE 2

| tire | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| side surface first surface section profile line | presence straight presence | presence straight presence | presence straight presence | presence straight presence | presence straight presence | presence straight presence | presence straight presence | presence straight presence | presence straight presence |
| second surface section | | | | | | | | | |
| shoulder lateral groove secondary portion | bent presence | bent presence | bent presence | bent presence | bent presence | bent presence | bent presence | bent presence | nor bent absence |
| angle θ (deg.) | 35 | 35 | 20 | 45 | 10 | 50 | 50 | 10 | 0 |
| (V0−V1)/V0 | 0.4 | 0.4 | 0.4 | 0.4 | 0.4 | 0.4 | 0.1 | 0.6 | 0.4 |
| H2/H1 | 0.3 | 0.3 | 0.3 | 0.3 | 0.3 | 0.3 | 0.6 | 0.25 | 0.3 |
| ΣL2/L0 | 0.2 | 0.8 | 0.5 | 0.5 | 0.5 | 0.5 | 0.5 | 0.5 | 0.5 |
| cut resistance | 120 | 105 | 110 | 110 | 105 | 110 | 110 | 105 | 100 |
| mad performance | 105 | 120 | 120 | 110 | 120 | 105 | 100 | 105 | 120 |
| fuel efficiency | 105 | 120 | 120 | 110 | 120 | 105 | 105 | 125 | 120 |

As shown in Tables 1 and 2, it was confirmed that the working example tires were improved in the mud performance and the fuel efficiency while securing the cut resistance.

DESCRIPTION OF THE REFERENCE SIGNS 1 pneumatic tire
2 tread portion
3 shoulder lateral groove
3A main portion
3B secondary portion
3e inner edge
3S groove bottom surface
4 shoulder block
4S side surface
4T ground contacting top surface
15 first surface section
16 second surface section
19 straight line
20 virtual side surface
21 radial surface
22 groove bottom extension surface
J1 profile line
J2 profile line
P most distant position
Te tread edge

The invention claimed is:

1. A pneumatic tire comprising:
a tread portion provided with a plurality of shoulder lateral grooves extending axially outwardly to the tread edge and then radially inwardly from the tread edge, and a plurality of shoulder blocks divided by the shoulder lateral grooves,
wherein
each of the shoulder blocks has an axially outer edge extending substantially straight and forming a part of the tread edge, and
each of the shoulder blocks has a side surface extending radially inwardly from the axially outer edge, wherein
the side surface includes a first surface section and a second surface section which are arranged in the circumferential direction of the tire, and protrude farther outward of the tire than the groove bottom surfaces of the shoulder lateral grooves,
in a tire meridian section including the first surface section, a profile line of the first surface section extends straight from the axially outer edge to a position corresponding to a position of the radial inner end of the shoulder lateral groove, and
in a tire meridian section including the second surface section, a profile line of the second surface section extends in a concave shape from the axially outer edge to a position corresponding to the above-said position of the radial inner end of the shoulder lateral groove through a path inward of the tire than that of the profile line of the first surface section.

2. The pneumatic tire as claimed in claim 1, wherein
the profile line of the second surface section has the most distant position from the profile line of the first surface section when these profile lines are superimposed, and
the radial dimension H2 from the tread edge to the most distant position is not more than 0.5 times the radial dimension H1 from the tread edge to the above-said position of the radial inner ends of the shoulder lateral grooves.

3. The pneumatic tire as claimed in claim 1, wherein,
in each of the shoulder blocks, the total length ΣL2 in the tire circumferential direction of the second surface section or sections measured at the tread edge is not less than 0.3 times and not more than 0.7 times the length L0 in the tire circumferential direction of the shoulder block measured at the tread edge.

4. The pneumatic tire as claimed in claim 1, wherein, each of the shoulder blocks satisfy the following condition (3):

$$0.2 \leq (V0-V1)/V0 \leq 0.6 \quad (3)$$

wherein V0 is a volume enclosed by
- a virtual side surface which is the above-said side surface of which entirety is assumed as being formed by the first surface section to have the profile line of the first surface section,
- a radial surface defined as extending radially inwardly from the tread edge in parallel to the tire radial direction, and
- a groove bottom extension surface which is a surface extended from the groove bottom in the tire circumferential direction, and V1 is a volume of a portion enclosed by the actual side surface, said radial surface, and said groove bottom extension surface.

5. The pneumatic tire as claimed in claim 1, wherein radially inner ends of the first and second surface sections are substantially straight and are continuous with the radially inner ends of the shoulder lateral groove bottoms.

6. The pneumatic tire as claimed in claim 1, wherein
a portion of the groove bottom surface of each shoulder lateral groove which is positioned between lateral side surfaces of the respective shoulder blocks located adjacently to said each shoulder lateral groove, extends to and ends at the position of the radial inner end of said each shoulder lateral groove through a path inward of the tire than the profile line of the second surface section.

7. The pneumatic tire as claimed in claim 6, wherein the profile line of the second surface section has the most distant position from the profile line of the first surface section when these profile lines are superimposed, and the radial dimension H2 from the tread edge to the most distant position is not more than 0.5 times the radial dimension H1 from the tread edge to the above-said position of the radial inner ends of the shoulder lateral grooves.

8. The pneumatic tire as claimed in claim 1, wherein
the tread portion is provided with a pair of shoulder circumferential grooves extending continuously in the tire circumferential direction to divide the shoulder blocks, and a crown circumferential groove extending continuously in the tire circumferential direction, and
crown blocks are formed between the crown circumferential groove and the shoulder circumferential grooves.

9. The pneumatic tire as claimed in claim 8, wherein the crown circumferential groove is a straight groove, and the shoulder circumferential grooves are zigzag grooves.

10. The pneumatic tire as claimed in claim 9, wherein lateral grooves circumferentially dividing the crown blocks are straight grooves.

11. The pneumatic tire as claimed in claim 1, wherein each of the shoulder lateral grooves comprises
a main portion extending axially outwardly at least to a position corresponding to the tread edge, and
a secondary portion extending radially inwardly from the main portion through between the adjacent shoulder blocks while inclining toward one side in the tire circumferential direction at an angle $\theta$ with respect to the main portion in a developed view of the tread surface and the block side surfaces.

12. The pneumatic tire as claimed in claim 11, wherein the profile line of the second surface section has the most distant position from the profile line of the first surface section when these profile lines are superimposed, and the radial dimension H2 from the tread edge to the most distant position is not more than 0.5 times the radial dimension H1 from the tread edge to the above-said position of the radial inner ends of the shoulder lateral grooves.

13. The pneumatic tire as claimed in claim 11, wherein, in each of the shoulder blocks, the total length $\Sigma L2$ in the tire circumferential direction of the second surface section or sections measured at the tread edge is not less than 0.3 times and not more than 0.7 times the length L0 in the tire circumferential direction of the shoulder block measured at the tread edge.

14. The pneumatic tire as claimed in claim 11, wherein the main portion of each shoulder lateral grooves extends straight.

15. The pneumatic tire as claimed in claim 14, wherein the profile line of the second surface section has the most distant position from the profile line of the first surface section when these profile lines are superimposed, and the radial dimension H2 from the tread edge to the most distant position is not more than 0.5 times the radial dimension H1 from the tread edge to the above-said position of the radial inner ends of the shoulder lateral grooves.

16. The pneumatic tire as claimed in claim 11, wherein the angle $\theta$ is in a range from 20 to 45 degrees.

17. The pneumatic tire as claimed in claim 16, wherein the profile line of the second surface section has the most distant position from the profile line of the first surface section when these profile lines are superimposed, and the radial dimension H2 from the tread edge to the most distant position is not more than 0.5 times the radial dimension H1 from the tread edge to the above-said position of the radial inner ends of the shoulder lateral grooves.

18. The pneumatic tire as claimed in claim 16, wherein, in each of the shoulder blocks, the total length $\Sigma L2$ in the tire circumferential direction of the second surface section or sections measured at the tread edge is not less than 0.3 times and not more than 0.7 times the length L0 in the tire circumferential direction of the shoulder block measured at the tread edge.

19. The pneumatic tire as claimed in claim 16, wherein the main portion of each shoulder lateral grooves extends straight.

20. The pneumatic tire as claimed in claim 19, wherein the profile line of the second surface section has the most distant position from the profile line of the first surface section when these profile lines are superimposed, and the radial dimension H2 from the tread edge to the most distant position is not more than 0.5 times the radial dimension H1 from the tread edge to the above-said position of the radial inner ends of the shoulder lateral grooves.

* * * * *